(12) United States Patent
Kaufer et al.

(10) Patent No.: US 9,703,116 B2
(45) Date of Patent: Jul. 11, 2017

(54) EYEGLASS FRAMES WITH FLEXIBLE TEMPLES

(71) Applicant: Under Armour, Inc., Baltimore, MD (US)

(72) Inventors: Adam Harris Kaufer, Cuchogue, NY (US); Jonathan Michael Martin, Covington, KY (US); Alan Scott Tipp, Elkhorn, NE (US)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 14/616,184

(22) Filed: Feb. 6, 2015

(65) Prior Publication Data

US 2016/0231589 A1 Aug. 11, 2016

(51) Int. Cl.
*G02C 5/00* (2006.01)
*G02C 11/00* (2006.01)
(Continued)

(52) U.S. Cl.
CPC ...... *G02C 5/14* (2013.01); *G02C 5/22* (2013.01)

(58) Field of Classification Search
CPC .......... G02C 5/006; G02C 5/146; G02C 5/10; G02C 2200/08; G02C 5/2209; G02C 5/143; G02C 3/003; G02C 5/00; G02C 5/16; G02C 2200/10; G02C 3/04; G02C 11/00; G02C 2200/02; G02C 5/2254; G02C 5/2227; G02C 2200/22; G02C 5/2236; G02C 2200/30; G02C 5/18; G02C 5/20; G02C 5/2263; G02C 2200/18; G02C 5/22; G02C 2200/16; G02C 5/02; G02C 1/06;
(Continued)

(56) References Cited

U.S. PATENT DOCUMENTS 6,618,901 B1 * 9/2003 Wang-Lee ........... G02C 5/2263
16/228
6,758,562 B1 7/2004 Barnette et al.
(Continued)

OTHER PUBLICATIONS

Amazon (Color:pink, Under Armour Men's Igniter 2.0 Sunglass) (Date Available on Mar. 15, 2013) (Retrieve on Apr. 29, 2016)(http://www.amazon.vom/Under-Armour-Igniter-2-0-8600051-187501/dp/B00SM2M08S/ref=sr_1_2?s=apparel&ie=UTF8&qid=1459960023&sr=1-2&nodeID=7141123011&keywords=Under+Armour+Men%E2%80%99s+Igniter+2.0+Sunglass).*
(Continued)

*Primary Examiner* — Scott J Sugarman
*Assistant Examiner* — Henry Duong
(74) *Attorney, Agent, or Firm* — Maginot, Moore & Beck LLP

(57) ABSTRACT

Eyeglass frames includes a face member configured to retain at least one lens and two temple members connected to the face member. Each temple member includes a spine made of a first material and an overlay made of a second material positioned on the spine, the first material having a greater hardness than the second material. The spine includes a column and a plurality of transverse ribs. The column extends from a face-end to an ear-end of the temple member and the transverse ribs are connected to the spine. Each of the transverse ribs defines an angle relative to an axis defined by the column of the spine. Slots are formed between the ribs and the ribs are successively narrower moving from the face-end to the ear-end. The overlay is positioned on the spine and fills the slots formed between the ribs.

18 Claims, 10 Drawing Sheets

(51) Int. Cl.
*G02C 5/14* (2006.01)
*G02C 5/22* (2006.01)

(58) Field of Classification Search
CPC ... G02C 5/06; G02C 5/12; G02C 1/04; G02C 5/04; G02C 5/124; A45F 2200/0541; A45F 5/02
USPC ........................................................ 351/116
See application file for complete search history.

(56) References Cited

U.S. PATENT DOCUMENTS

| | | | |
|---|---|---|---|
| 7,097,908 B2 * | 8/2006 | Lacroix | A43B 1/0027 |
| | | | 264/241 |
| 7,553,017 B1 | 6/2009 | Chen | |
| 7,878,647 B2 | 2/2011 | Hardy | |
| 8,388,128 B2 | 3/2013 | Yang | |
| 8,444,265 B2 | 5/2013 | Yee et al. | |
| 8,783,862 B2 | 7/2014 | Marini et al. | |

OTHER PUBLICATIONS

Meflecto, http://www.persol.com/usa/technology/meflecto, 2015.

\* cited by examiner

EYEGLASS FRAMES WITH FLEXIBLE TEMPLES

FIELD

This document relates to the field of eyeglasses, and particularly temple members for eyeglass frames.

BACKGROUND

Eyeglasses have been used for hundreds of years to provide vision assistance to wearers. Eyeglasses typically comprise a face member including two eyewires or rims that hold lenses and a bridge that connects the two rims. The bridge may include a nosepiece to allow the rims to rest more comfortably on a wearer's nose. A temple member extends from the lateral side of each rim. The temple member is designed to extend rearwardly on the head of the wearer and over the ears in order to provide a resting position for the eyeglasses on the face of the wearer.

Eyeglasses provide vision assistance to the wearer in various ways. Prescription lenses provide corrective vision for the wearer, assisting the wearer in seeing near or distant objects more clearly. Sunglasses may or may not include corrective lenses, but provide the benefit of blocking bright or excessive light from the eyes of a wearer. Eyeglasses may also provide protection for the eye of the wearer, including protection from wind or from flying debris.

Sunglasses may be particularly useful for a wearer participating in athletic events. In these situations, the glasses should provide vision benefits including protection from light, wind and other elements. In addition, sunglasses or other eyeglasses worn for athletic activity should be comfortable and fit properly on the wearer's head. If the eyeglasses are not comfortable or do not fit properly, the eyeglasses may be distracting to the wearer. This may cause the wearer to repeatedly adjust the positioning of the eyeglasses glasses on his or her face during the athletic event in an attempt to obtain a more secure and comfortable fit.

Unfortunately, obtaining a proper fit for sunglasses and other eyeglasses is often difficult. Most sunglasses and other eyeglasses are sold in only a single size (or adult and junior sizes). However, heads and faces of wearers come in numerous shapes and sizes. As a result, it is difficult for manufacturers to manufacture sunglasses that will fit numerous individuals properly. For example, if the temples are too close together, many wearers may find that the sunglasses fit too snugly on the head. On the other hand, if the temples are too far apart, many users may find that the sunglasses fit too loosely on the head.

A number of eyeglass designs which promise to provide a snug yet comfortable fit are currently available on the market. However, each of these designs fails to provide optimal fit and comfort for the wearer. In one common eyeglass design, an armature (i.e., a wire core) is hidden inside of a rubber outer skin. As a result, the temples are flexible, but the wearer is forces to continuously adjust the temples in an attempt to obtain a comfortable yet snug fit based on the unique size and shape of the head of the wearer Accordingly, it would be advantageous to provide sunglasses and other eyeglasses that are comfortable for multiple wearers while also adapting to properly fit the heads of numerous differently sized wearers. It would also be advantageous if the temples of the eyeglasses were configured to automatically adjust to any of various unique head sizes and shapes, allowing the temples to actively (rather than passively) embrace the head of the wearer. It would also be advantageous if the same features of the sunglasses that were used to provide comfort and fit were incorporated into the sunglasses in a manner to make the same features appear to be primarily aesthetic.

SUMMARY

In accordance with one exemplary embodiment of the disclosure, there is provided eyeglass frames comprising a face member configured to retain at least one lens and two temple members connected to the face member. Each temple member includes a spine and an overlay positioned on the spine. The spine is comprised of a first material and includes a column and a plurality of transverse ribs. The column extends from a face-end to an ear-end of the temple member and the transverse ribs are connected to the spine. Each of the transverse ribs defines an angle relative to an axis defined by the column of the spine. Slots are formed between the ribs and the ribs are successively narrower moving from the face-end to the ear-end. The overlay is positioned on the spine and fills the slots formed between the ribs. The overlay is comprised of a second material different from the first material, the first material having a greater hardness than the second material.

Pursuant to another exemplary embodiment of the disclosure, there is provided eyeglass frames comprising a face member configured to retain at least one lens and two temple members connected to the face member by two hinges. Each temple member includes a spine and an overlay. The spine is comprised of a first material and extends from a face-end to an ear-end of the temple member. The overlay is comprised of a second material, the first material having a greater hardness than the second material. The overlay only partially covering the spine such that a substantial portion of the spine is exposed on the temple member. The two hinges connect the temple members to the face member. Each hinge defines a pivot axis for the one of the two temple members that is substantially perpendicular to the axis defined by the column of the spine. The spine further comprises at least one elongated notch extending substantially parallel to the pivot axis on at least one of a medial or a lateral side of the spine. The elongated notch is covered by the overlay and is positioned closer to the face-end than the ear-end of the one of the temple members. The height of the spine in a direction defined by the pivot axis is equal at the notch and at positions immediately adjacent to the notch.

The above described features and advantages, as well as others, will become more readily apparent to those of ordinary skill in the art by reference to the following detailed description and accompanying drawings. While it would be desirable to provide eyeglass frames that provide one or more of these or other advantageous features, the teachings disclosed herein extend to those embodiments which fall within the scope of the appended claims, regardless of whether they accomplish one or more of the above-mentioned advantages.

DESCRIPTION

Figure 1:
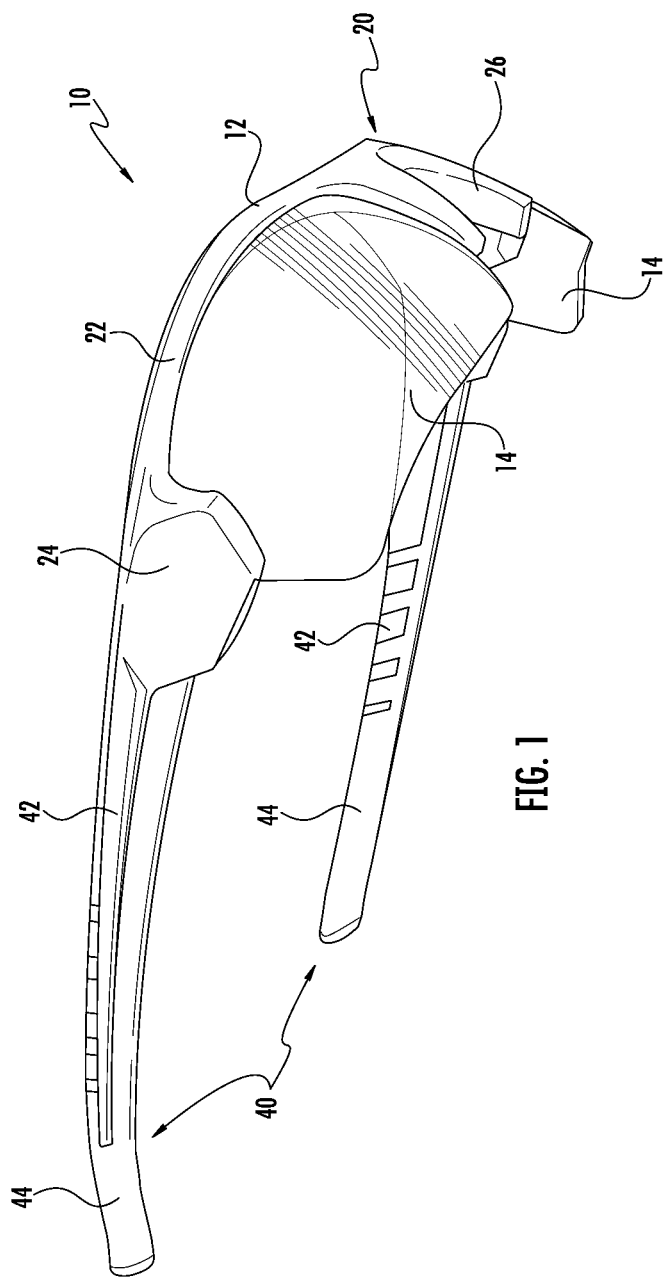
FIG. 1 is a perspective view of eyeglasses including one embodiment of frames with a flexible temple member.

With reference to FIG. 1, in at least one embodiment, a set of eyeglasses 10 includes eyeglass frames 12 with a pair of lenses 14 supported by the frames 12. The frames 12 include a face member 20 and a pair of temple members 40 connected to the face member 20. The face member 20 is configured to extend across the face of a wearer and retain the lenses 14 in position over the eyes of a wearer of the eyeglasses 10. The temple members 40 are configured to extend rearwardly from the face member 20 and rest on the ears of the wearer. Accordingly, the frames 12 are supported by the head of the wearer with the face member 20 engaging the nose of the wearer and the temple members 40 engaging the ears of the wearer.

With continued reference to FIG. 1, the lenses 14 of the eyeglasses 10 may be provided as any of various lens types as will be recognized by those of ordinary skill in the art. Examples of different types of lenses include prescription and non-prescription lenses, darkened lenses, or lenses with any of various additional features such as shatter-proof lenses, glare-resistant lenses, polarized lenses, or any of various other types of lenses. If the lenses 14 are darkened or include light blocking features, the eyeglasses may be considered "sunglasses". In some embodiments, the lenses 14 may be transitional lenses that change from transparent to translucent/darkened when exposed to ultra-violet radiation. Although two lenses are shown in the embodiment of FIG. 1, the eyeglass 10 may alternatively be configured to retain a unitary lens provided by a single piece of plastic or glass which covers both eyes of the wearer.

Figure 2:
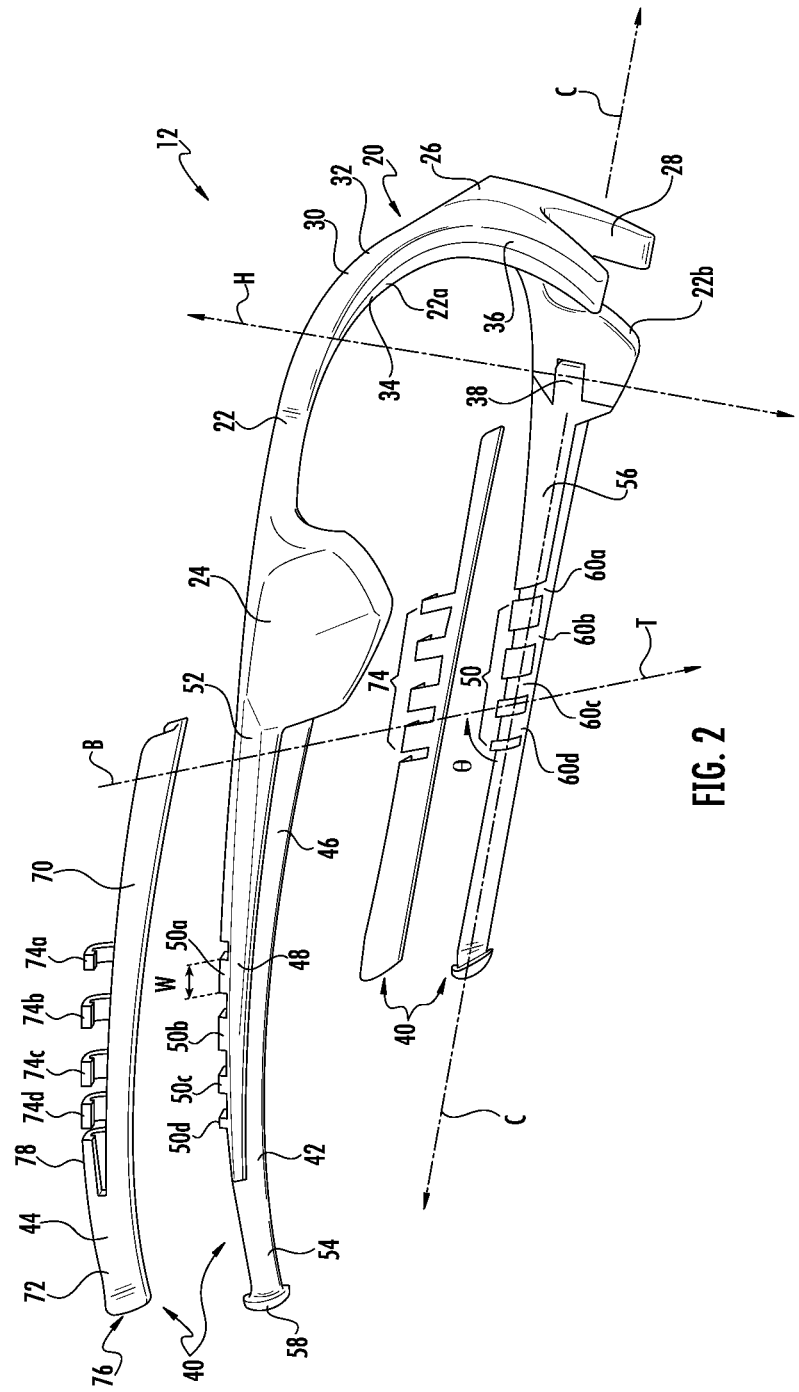
FIG. 2 is a perspective view of the eyeglass frames of FIG. 1 with a temple overlay removed from a temple spine.

With reference now to FIGS. 1 and 2, the face member 20 includes a pair of rims 22, rim extension member 24 and a bridge 26. The rims 22 include a right rim 22a and a left rim 22b (as used herein, the singular term "rim 22" refers to either the right rim 22a or the left rim 22b, and the plural term "rims 22" refers to both the right rim 22a and the left rim 22b). The rims 22 are configured to retain the lenses 14. In the embodiment of FIGS. 1 and 2, each rim 22 is partial rim (which may also be referred to as a "half-frame rims") that does not completely encircle the lens 14 retained by the rim 22. As shown in FIG. 2, each rim 22 includes an upper brow 30 including a front surface 32, a rear surface 34, and a central groove 36 formed between the front surface 32 and the rear surface 34. The lens 14 is positioned in the central groove 36. The lens 14 is retained in the central groove 36 using any of various fastening means, such as an adhesive, a screw that extends through the rear surface 34 and lens 14 and into the brow 30, or some combination thereof.

The bridge 26 of the face member 20 is provided at a medial side of each rim 22. The bridge 26 includes a lower surface 28 that is contoured in an arch-like shape to curve around the nose of the wearer. The bridge 26 joins the right side rim 22a to the left side rim 22b. In the embodiment of FIGS. 1 and 2, the bridge 26 is provided as a unitary component with the rims 22. The unitary component may be molded or otherwise formed from any of various materials as will be recognized by those of ordinary skill in the art. For example, the rims 22 and the bridge 26 of the face member may be comprised of a thermoplastic polyamide based on aliphatic and cycloaliphatic blocks. In other exemplary embodiments, the rims 22 and the bridge 26 of the face member may be comprised of other materials, such as thermoplastic polyurethane or other polymer materials. A nose pad (not shown) may be coupled to the bridge 26 to rest on the nose of the wearer. The nose pad may be comprised of a resilient material having a lesser hardness than the rims 22 and bridge 26 such that the nose pad is comfortable against the skin of the wearer and helps secure the frames 12 in place on the face of the wearer.

The lateral side of each rim 22 is connected to a rim extension member 24. The rim extension member 24 is generally a bulbous or otherwise enlarged portion of the frames 12 that is provided on the lateral sides of the face member 20 between the lenses 14 and the temple members 40. As shown in FIG. 2, a hinge 38 is provided at the rim extension member 24. The hinge 38 allows the associated temple member 40 to pivot about a pivot axis H defined by the hinge 38. It will be recognized that in certain other embodiments, the frames 12 may be configured without a hinge between the face member 20 and the temple members 40.

Two temple members 40 are connected to the face member 20 (as used herein, the singular term "temple member 40" refers to either the right temple member 40a or the left temple member 40b, and the plural term "temple members 40" refers to both the right temple member 40a and the left temple member 40b). In the embodiment of FIGS. 1-2, each temple member 40 is connected to the face member 20 via a hinge 38. Each temple member 40 is provided as an elongated structure configured to extend from the face member 20 to a position behind the ear of the wearer. Each temple member 40 is generally rod-like and may include an end portion that curves either downward or inward, or both downward and inward.

Each temple member 40 is provided as a multiple-part component including a spine 42 comprised of a first material and the overlay 44 comprised of a second material. FIG. 2 shows the overlay 44 of the temple member 40 separated from the spine for purposes of illustrating the components of both the spine 42 and the overlay 44. However, in at least one embodiment, the spine 42 and the overlay are co-molded in such a manner that the overlay 44 is non-removably coupled to the spine 42.

As shown in FIG. 2, the spine 42 includes an elongated column 46, an axial rib 48 on the lateral side of the column 46, and a plurality of transverse ribs 50 on a medial side of the column 46. The column 46 extends from a face-end 52 to an ear-end 54 of the temple member 40. The column 46 is generally rod-like but does not necessarily extend along a straight axis and may instead curve somewhat relative to an axis defined by the column 46. For example, the ear-end 54 of the column 46 may curve slightly downward and inwardly from an axis defined along the face-end 52 of the column 46.

The axial rib 48 begins at the face-end 52 of the column 46 and extends past the midpoint of the spine 42 to the ear-end 54 of the column 46. The axial rib 48 is substantially parallel to the axis C defined by the column 46. The axial rib 48 extends between 0.5 mm and 1.5 mm outward from the column 46 on the lateral side of the spine 42 such that a small ridge is formed under the axial rib 48. The axial rib 48 may be slightly tapered near the ear-end 54 of the temple member 40. The placement of the axial rib 48 in a generally central location on column 46 provides structural support for the column 46.

Transverse ribs 50 are provided between the face-end 52 and the ear-end 54 of the spine 42. As used herein, the singular term "transverse rib 50" refers to any one of transverse ribs 50a, 50b, 50c or 50d, and the plural term "transverse ribs 50" refers to all of transverse ribs 50a-50d. Each transverse rib 50 extends inwardly from the column 46 on a medial side of the spine 42. A first transverse rib 50a is spaced apart from an upper block 56 provided on an upper medial side of the spine 42. The upper block 56 provides bulk and therefore additional stiffness to the temple members 40 at the face-end 52 of the spine 42. Three successive transverse ribs 50b, 50c and 50d follow the first transverse rib 50a moving toward the ear-end 54 of the temple member 40. Each successive transverse rib 50 is narrower than the previous rib. Slots 60 are defined between each of the transverse ribs 50 and between the first transverse rib 50a and the upper block 56. As used herein, the singular term "slot 60" refers to any one of slots 60a, 60b, 60c or 60d, and the plural term "slots 60" refers to all of slots 60a-60d.

As shown in FIG. 2, the transverse ribs 50 generally extend from a position above the column 46 to a position near the bottom of the column 46. The direction in which the transverse ribs 50 are oriented generally defines an axis T that is transverse to the axis C defined by the column 46 of the spine 42. The axis T is also transverse to the axis H that is substantially perpendicular to the axis C. Accordingly, the transverse ribs 50 define an angle θ relative to an axis defined by the column of the spine (i.e., the angle θ is defined by the axis C and a ray of axis T extending upward from the axis C and directed away from the face member 20 of the eyeglass frames 12). In the embodiment shown in FIGS. 1 and 2, the transverse ribs 50 all define the same angle θ. In at least one embodiment, the transverse ribs 50 are all angled between thirty and eighty degrees from the axis C (i.e., 40°<θ<80°. In at least one embodiment, the transverse ribs 50 are angled between fifty-five and seventy-five degrees from the axis C (i.e., 50°<θ<70°, and are particularly angled about 60° from the axis C (i.e., θ=60°).

With continued reference to FIG. 2, the ribs 50 are successively narrower moving from the face-end 52 to the ear-end 54 of the temple member 40. Conversely, the slots 60 between the ribs 50 are successively wider moving from the face-end 52 to the ear-end 54 of the temple member 40. In the embodiment of FIG. 2, each transverse rib 50 has a width w (only the width w of the transverse rib 50a nearest the ear-end is shown in FIG. 2). In at least one embodiment, the width w of the first rib 50a is between 3 mm and 10 mm, and the width w of the most distal rib 50d is between 1 mm and 3 mm. The slots 60 may have comparable widths. In one particular embodiment, the width w of the first rib 50a is about 5 mm, the width of the second rib 50b is 4 mm, the width of the third rib 50c is 3 mm, and the width of the fourth rib 50d is 2 mm. Similarly, in this embodiment, the width of the first slot 60a is about 2 mm, the width of the second slot 60b is 3 mm, the width of the third slot 60c is 4 mm, and the width of the fourth slot 60d is 5 mm. This arrangement wherein the ribs 50 are successively narrower and the slots 60 are successively wider results in a temple member 40 that becomes increasingly flexible when approaching the ear-end 54 of the spine 42. As a result of this flexibility, the temple arrangement 40 provides less pressure on the occipital bones but still provides a secure fit for the sunglasses on the head of the wearer.

Figure 3:
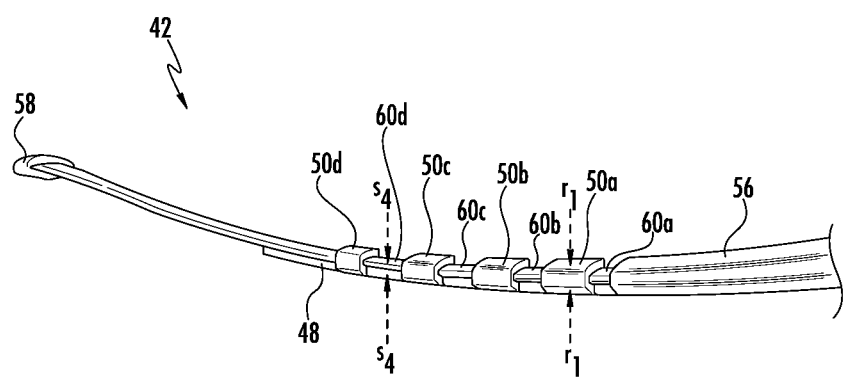
FIG. 3 is a top view of the temple spine of FIG. 2.
Figure 4:
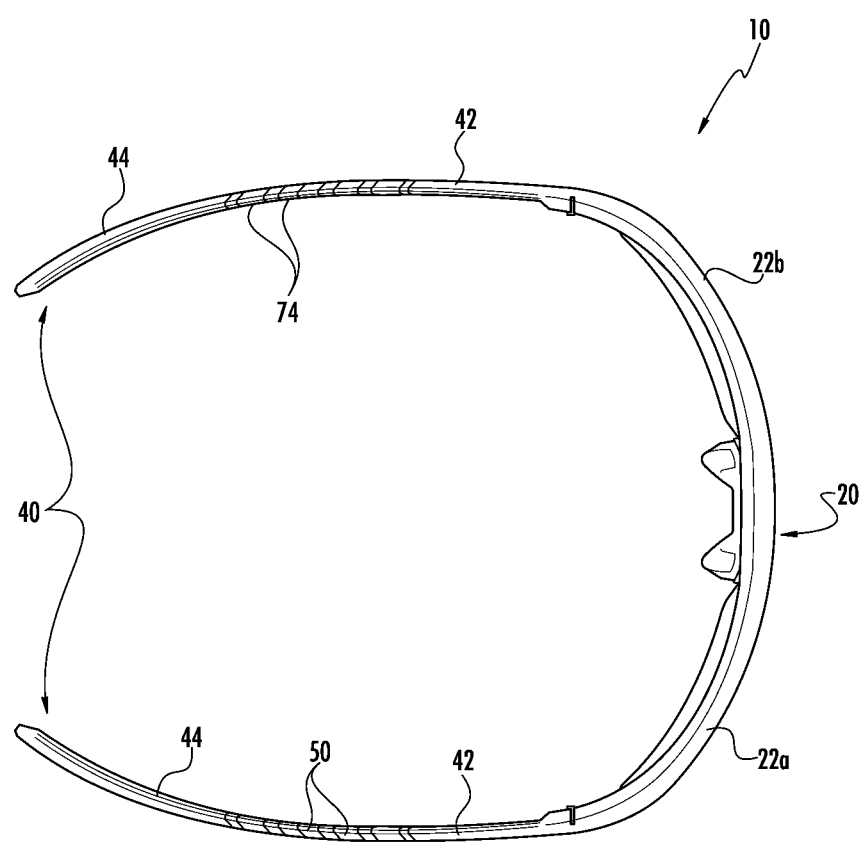
FIG. 4 is a top view of the eyeglass frames of FIG. 1 with the overlay positioned on the spine.

With reference now to FIG. 3, a top view of the spine 42 of FIG. 2 is shown with the overlay 44 removed from the spine 42. A thickness (or lateral depth) of the spine 42 at one of the ribs 50a is indicated by dimension $r_1$. Another thickness of the spine 42 at one of the slots 60d is indicated by dimension $s_4$. In at least one embodiment, the thickness $r_1$ of the spine 42 at the transverse rib 50a is between 2 mm and 5 mm, and more particularly about 3 mm or 4 mm. In this embodiment, the thickness of the spine 42 at all the transverse ribs 50 and the block 56 may be the same as the thickness $r_1$. Also, the thickness $s_4$ of the spine across the slot 60d is between 0.5 mm and 2 mm, and more particularly about 1 mm or 1.5 mm. Also, the thickness of the spine 42 at all of the slots 60 may be the same as the thickness $s_4$. Accordingly, the thickness of the spine 42 alternates between a greater thickness at the ribs 50 and a lesser thickness in the slots 60.

As explained in further detail below, this spine arrangement with an alternating thickness facilitates flexation of the spine 42 in a medial and lateral direction.

With reference again to FIG. 2, the spine 42, including the column 46, axial rib 48, transverse ribs 50, and block 56, is provided a unitary component formed from a first material having a greater hardness (e.g., a greater durometer) than the overlay 44. For example, in at least one exemplary embodiment the Shore hardness of the spine 42 is between 40 A and 55 A, and the Shore hardness of the overlay 44 is between 20 A and 35 A. Shore hardnesses in this range for the spine 42 and the overlay 44 provide a desired flex resulting in a comfortable fit for the wearer. In at least one embodiment, the spine 42 is comprised of a thermoplastic polyamide based on aliphatic and cycloaliphatic blocks and does not contain a plasticizer. The thermoplastic polyamide material may exhibit good heat resistance, excellent fatigue behavior, low moisture absorption and dimensional stability. One exemplary material that may be used as the first material is GRILAMID TR® 90. Other materials may also be used as the first material. In at least one embodiment, the first material is a nylon based polymer material.

The overlay 44 is comprised of a second material having a lesser hardness (e.g. a lesser durometer) than the first material that forms the spine 42. In at least one embodiment, the overlay 44 is comprised of a thermoplastic elastomer (TPE) material such as a thermoplastic polyurethane (TPU). In other embodiments, the overlay 44 may be comprised of natural or synthetic rubber materials or any of various other polymer materials. The overlay 44 generally exhibits less stiffness and a softer, more resilient feel to the wearer than the spine 42.

The overlay 44 provides a sleeve that at least partially covers portions of the spine 42. In the embodiment of FIGS. 1 and 2, the overlay 44 completely covers portions of the spine 42 between the end of the axial rib 48 and the tip 58 of the spine 42. The overlay 44 does not cover the transverse ribs 50 but fills the slots 60 formed between the transverse ribs 50.

The overlay 44 generally includes a channel portion 70, an upper cover portion 72, a tip opening 76, and a plurality of fingers 74. The channel portion 70 extends from the face-end 52 to the ear-end 54 of the overlay 44. The channel portion 70 defines an open groove that receives the lower side of the spine 42 under the axial rib 48. Accordingly, the channel portion 70 covers the entire lower side of the spine 42 from the face-end to a position near the tip 58 of the spine 42.

The upper cover portion 72 of the overlay 44 covers the upper side of the spine 42 only at the ear-end 54 of the temple member 40. Accordingly, the spine is completely covered between the end of the axial rib 48 and the tip 58, with the channel portion 70 of the overlay 44 covering the lower side of the spine 42 and the upper cover portion 72 of the overlay 44 covering the upper side of the spine 42. The upper cover portion 72 of the overlay 44 also includes a short length 78 that covers the upper side of the spine 42 above the axial rib 48. The spine 42 passes through the opening 74 in the overlay 44 at the ear-end 54 of the temple member 40 such that the tip 58 of the spine 42 is exposed at the ear-end 54 of the temple member 40.

The plurality of fingers 76 are successively positioned on the overlay 44 before the cover portion 72 (i.e., the fingers 76 are positioned closer to the face-end of the overlay 44 than the cover portion 72). As used herein, the singular term "finger 74" refers to any one of fingers 74a, 74b, 74c or 74d, and the plural term "fingers 74" refers to all of fingers 74a-74d. The fingers 74 extend upward from the channel portion 70 on a medial side of the overlay 44 and curve around to the lateral side of the overlay 44. Each finger 70 is dimensioned to fit within one of the slots 60. Accordingly, each finger 70 is successively wider moving from the face-end 52 to the ear-end 54 of the overlay 44.

When the overlay 44 is properly positioned on the spine 42, the exposed outer surface of the overlay 44 is substantially co-planar with the exposed outer surface of the spine 42 over most of the temple member 40. In particular, the adjacent surfaces of the fingers 76 and ribs 50 are substantially coplanar, including adjacent surfaces on the upper, medial and lateral sides of the temple member. A narrow seam exists at the junction between the fingers 76 of the overlay 44 and the ribs 50 of the spine 42. This seam may be tactilely perceptible to the wearer, but the outer surface of the temple member 40 appears to be a substantially flat and continuous to the eyes of the wearer. In at least one embodiment, the overlay 44 may be of a different color than the spine 42. For example, the spine 42 may be blue and the overlay 44 may be white. As a result, the angled ribs 50 of the spine 42 may provide an interesting aesthetic design against the overlay 44. Notwithstanding this aesthetic design, the combined spine 42 and overlay 44 also provide useful functional features for the temple members 40, as described in further detail below.

The combination of the spine 42 and the overlay 44 provides a flexible temple member 40 that easily conforms to the head of the wearer and provides a snug yet comfortable fit for the eyeglasses 10. The material used to form the spine 42 provides a relatively stiff core member (compared to the overlay 44) that offers significant support for the temple member 40. At the same time, the material used to form the spine 42 is sufficiently flexible and resilient to cause the spine to yield to a threshold force and then return to its original shape when the threshold force is removed. The structural elements of the spine 42, including the column 46, axial rib 48 and transverse ribs 50, provide an arrangement that facilitates flexing of the spine 42 to a significant degree in the lateral and medial directions (i.e., in the directions defined by an axis that is perpendicular to both of axis H and axis C), but only a minimal degree in the upward and downward directions (i.e., in the directions defined by axis H).

The overlay 44 works in association with the spine 42 to offer additional comfort for the wearer and flexibility to the temple member 40. The material used to form the overlay 44 provides a relatively soft and flexible material (compared to the spine 42). This soft and flexible material of the overlay 44 covers most of the regions of the temple member 40 designed to engage the wearer's head, including the ear-end 54 of the temple member 40 (which is designed to engage the side of the head of the wearer), and the lower portion of the temple member 40 (which is designed to rest upon the ear of the wearer).

The overall shape of each temple member 40 is such that the temple member 40 is relatively straight near the face-end 52, but curves slightly inwardly (i.e., in a medial direction) at the ear-end 54 of the temple member 40. The shape and angle of the ribs 50, including the decreasing width of the ribs 50 (and increasing width of the slots 60), compliments this inward curvature at the ear-end 54 of the temple member 40. Overall, the various features of the spine 42 in combination with the overlay 44 results in temple members 40 designed to automatically adjust to any of various unique head sizes and shapes while still providing a comfortable and proper fit.

In at least one embodiment, the spine 42 and the overlay 44 are provided as a unitary component with the overlay 44 non-removeably positioned on the spine 42 such that removal of the overlay 44 from the spine will result in destruction of the overlay 44. In order to achieve this unitary structure, the overlay 44 may be co-injection molded along with the spine 42 using a double shot injection molding method. According to this method, the first shot may be provided from a first nozzle which includes the first polymer material that forms the spine 42 and already has the desired color for the spine. After the spine is cured in the mold, the mold receives the second shot from a second nozzle. This second shot includes the second polymer material that forms the overlay 44 and already has the desired color for the overlay 44. When the second shot of second polymer material is inserted into the mold, a bonding between the first polymer material and the second polymer material occurs at the molecular level because of the heat associated with the second shot and some degree of melting and blending of the first and second polymer materials around the peripheral surface of the spine 42.

Figure 5:
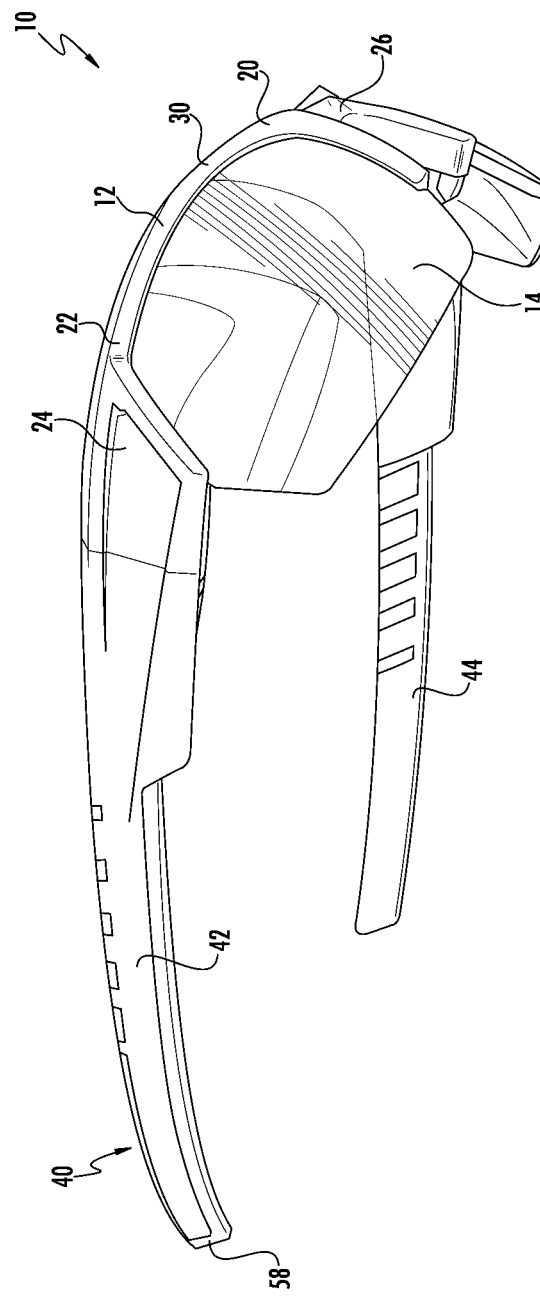
FIG. 5 shows a perspective view of another embodiment of eyeglass frames with a flexible temple member.
Figure 6:
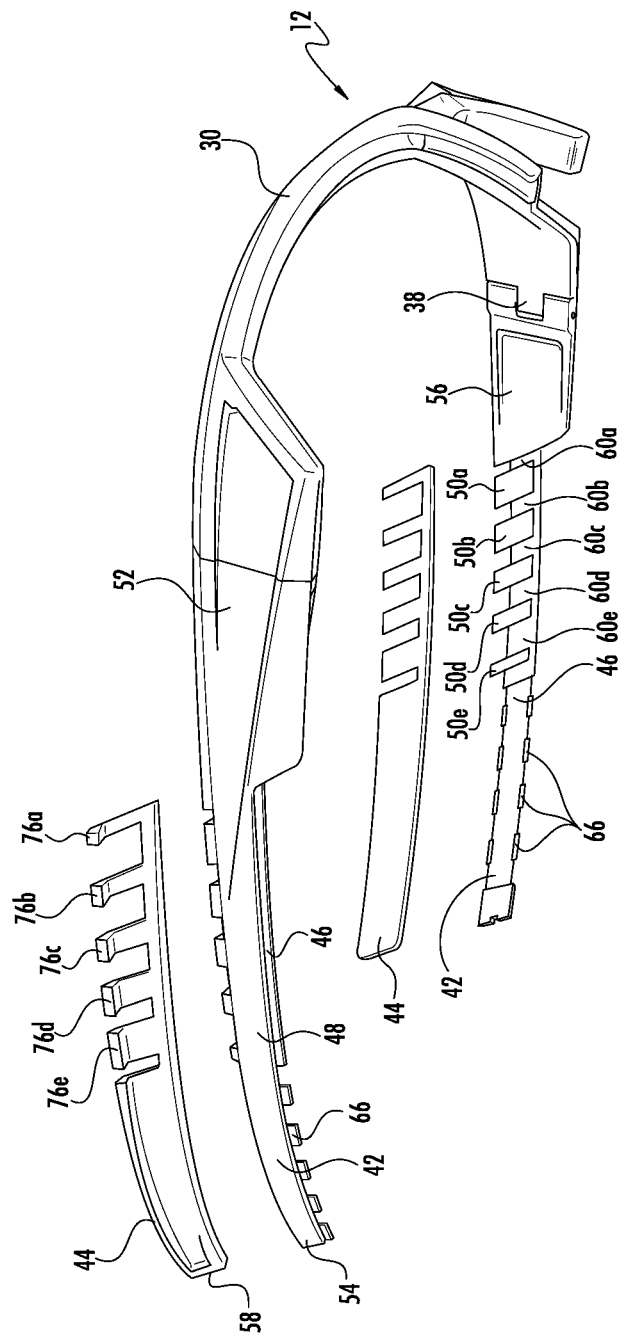
FIG. 6 is a perspective view of the eyeglass frames of FIG. 6 with a temple overlay of the frame removed from a temple spine.
Figure 7:
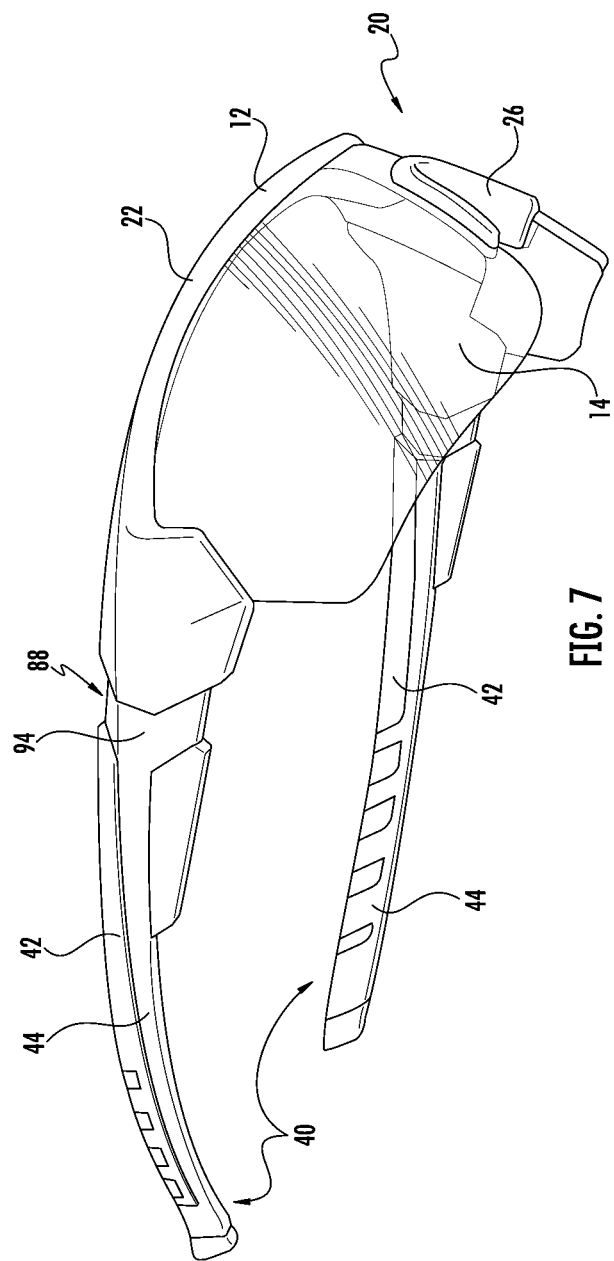
FIG. 7 is a perspective view of yet another embodiment of an eyeglass frame with a flexible temple member.

With reference now to FIGS. 5-6, an alternative embodiment of the eyeglass frames 12 is shown. The embodiment of FIGS. 5-6 is substantially similar to the embodiment of FIGS. 1-4 and like reference numerals are used to refer to the same or similar components. However, several distinctions exist between the embodiment of FIGS. 5-6 and the embodiment of FIGS. 1-4. For example, the embodiment of FIGS. 5-6 the axial rib 48 extends further to the ear-end 54 of the temple member 40, but the overlay 44 completely covers the spine 42 at the tip 58 of the temple member 40. Also, the spine 42 includes five transverse ribs 50a-50e and five associated slots 60a-60e, each transverse rib 50 successively narrower and each of the slots 60 successively wider when moving from the face-end 52 to the ear-end 54 of the spine 42. Accordingly, the overlay 44 also includes five fingers 76a-76e configured for placement in the slots 60.

Furthermore, in the embodiment of FIG. 6, the spine 42 includes a plurality of tabs 64 on the ear-end of the column 46 that provide surface irregularities which are completely covered by the overlay 44. These tabs 64 assist in securing the overlay 44 on the spine 42 by providing a mechanical arrangement that further prevents the overlay 44 from sliding on the spine 42, and providing additional surface area for bonding between the overlay material and the spine material during the molding process.

Figure 8:
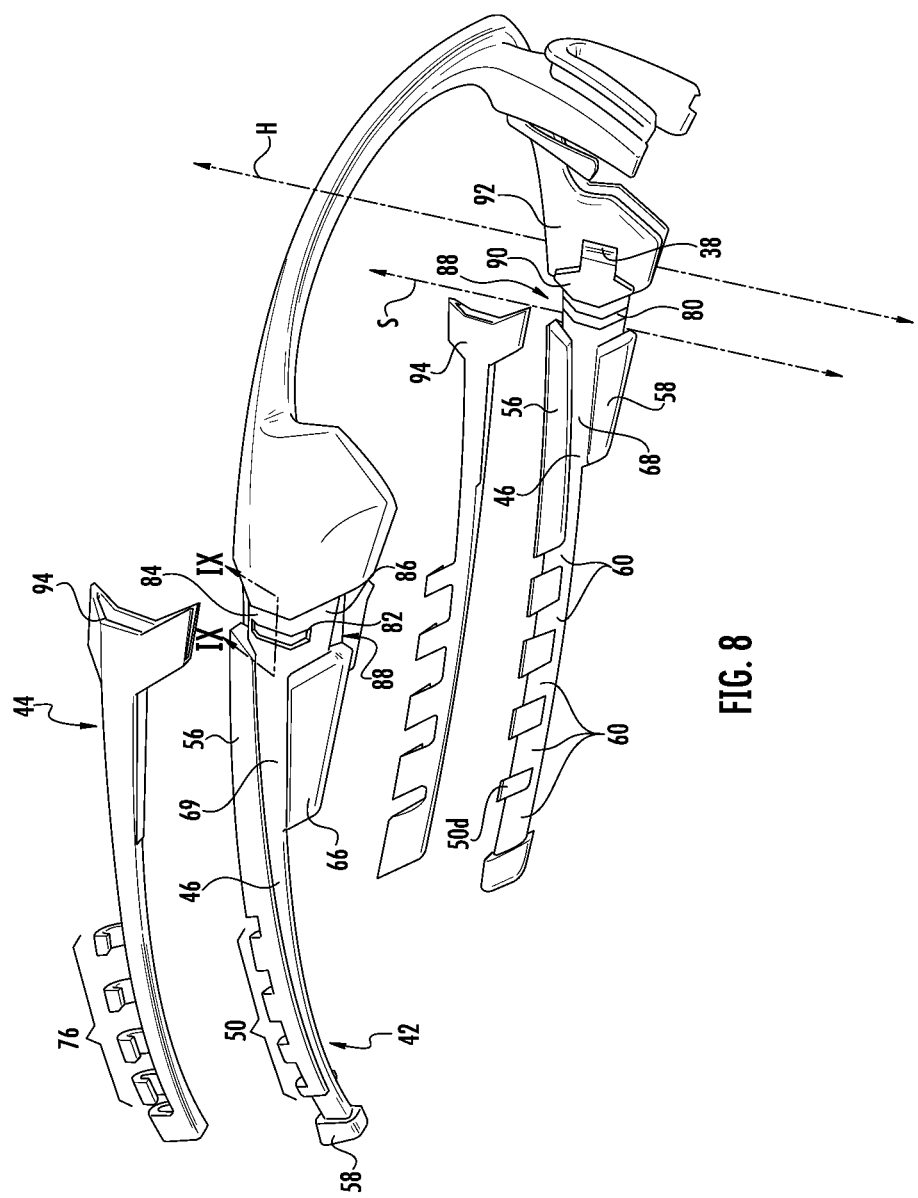
FIG. 8 is a perspective view of the eyeglass frame of FIG. 8 with a temple overlay removed of the frame removed from a temple spine.
Figure 9:
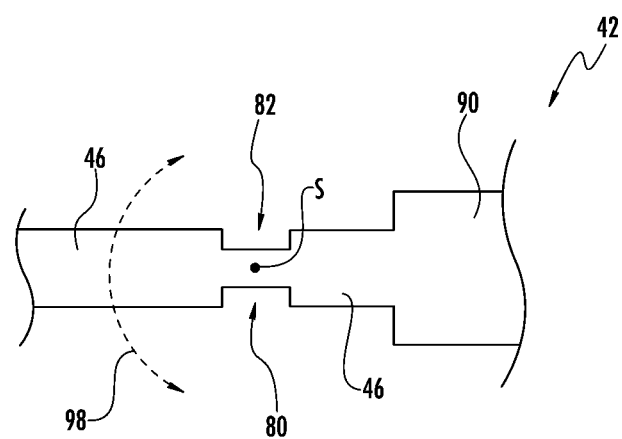
FIG. 9 is a cross-sectional view of the face-end of the spine through line IX-IX of FIG. 8 showing an elongated notch provided on the spine.
Figure 10:
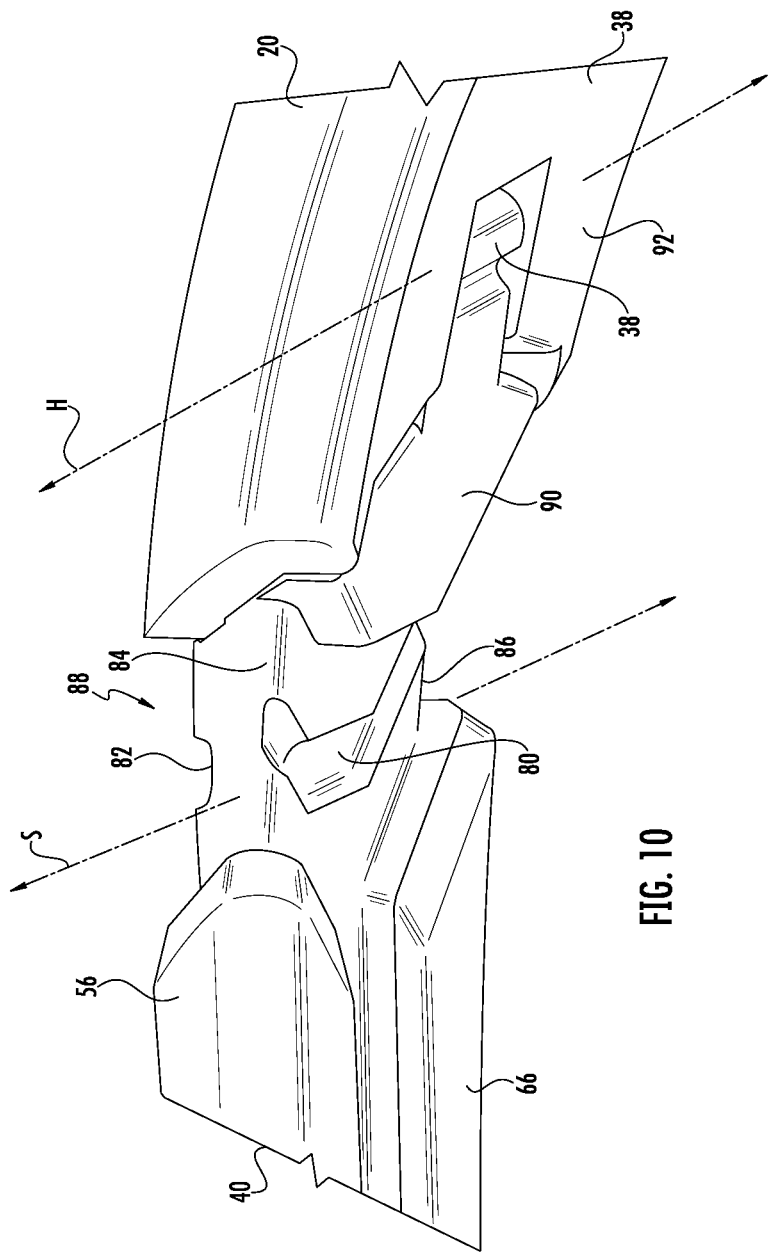
FIG. 10 shows an enlarged top perspective view of the medial elongated notch of FIGS. 8 and 9.

With reference now to FIGS. 7-10, an alternative embodiment of the eyeglass frame 12 is shown. The embodiment of FIGS. 7-10 is substantially similar to the embodiment of FIGS. 1-4 and like reference numerals are used to refer to the same or similar components. However, several distinctions exist between the embodiment of FIGS. 7-10 and the embodiment of FIGS. 1-4. For example, the frames 12 are configured for use with a shield lens 14 (i.e., a single-piece lens that covers both the left and right eye of the wearer and is provided by a unitary lens component comprised of plastic, glass, or other lens material). Also, as best shown in FIGS. 8-10, the spine 42 includes a medial elongated notch 80 and a lateral elongated notch 82 provided on the column 46 near the face-end 52 of the spine 42. Both the medial elongated notch 80 and the lateral elongated notch 82 extend in a direction that is substantially parallel to the hinge pivot axis H. The medial elongated notch 80 cuts into the column 46 from a position substantially at an upper perimeter of the column to a position substantially at the lower perimeter of the column. However, the medial elongated notch 80 does not reduce the height of the column 46 (i.e., the dimension in the direction of axis H). Similarly, the lateral elongated notch 82 also cuts into the column 46 from a position substantially at an upper perimeter of the column to a position substantially at the lower perimeter of the column without reducing the height of the column 46. In at least one embodiment, the lateral elongated notch 82 cuts into the central portion of the column 46, but does not extend to the upper and lower perimeters of the column. Instead, the lateral elongated notch 80 tapers into the column near the upper perimeter and lower perimeter portions of the column. The taper of the notch 80 is provided in association with an upper beveled portion 84 and a lower beveled portion 86 on the column 46. Because neither the medial elongated notch 80 nor the lateral elongated notch 82 cut into the upper or lower perimeters of the column 46, the height of the spine as defined by the pivot axis is equal at the notch and at positions immediately adjacent to the notch.

As shown in FIGS. 7-10, the spine 42 further includes both an upper block 56 and a lower block 66. In this embodiment, the lateral side of the upper block 56 extends past a central portion of the spine 42 and under each of the ribs 50, including under the most distal rib 50d on the ear-end 54 of the temple member 40. Accordingly, a continuous surface is provided between the upper block 56 and the ribs 50 on the lateral side of the temple member. In contrast, the medial side of the upper block 56 extends only toward a central portion of the spine 42, but does not extend to the ribs 50. Accordingly, the ribs are disjunct from the upper block 56 on the medial side of the spine 42. The lower block 66 is provided on the face end 52 of the spine 42 and does not extend to the ribs 50. A first channel 68 extends along the column 46 between the upper block 56 and the lower block 66 on the medial side of the spine 42. Similarly, a second channel 69 extends along the column 46 between the upper block 56 and the lower block 66 on the lateral side of the spine 42.

The hinge 38 includes a temple side 90 and a face side 92. The column 46 is connected to the temple side 90 of the hinge 38 and forms a unitary component therewith. The temple side 90 of the hinge forms one side of a vertically extending slot 88 at the face end 52 of the spine 42. The upper block 56 and the lower block 66 define an opposite side of the slot 88. The slot 88 is provided along both the lateral and medial side of the column 46. The medial notch 80 is provided on the medial side of the slot 88 and the lateral notch 82 is provided on the lateral side of the slot 88. In the embodiment disclosed in FIGS. 7-10, the first elongated notch and the second elongated notch are positioned on the spine between 2 mm and 10 mm away from the pivot axis H, and particularly, about 6 mm away from the pivot axis H. As best shown in FIG. 9, the thickness "$t_1$" of the spine between the first elongated notch and the second elongated notch is between 1.0 mm and 3.0 mm, and particularly about 2.0 mm. The thickness "$t_2$" of the spine immediately adjacent to the first elongated notch and the second elongated notch is between 3.0 mm and 6.0 mm, and particularly about 5.0 mm.

The overlay 44 in the embodiment of FIGS. 7-10 includes an enlarged mouth 94 that covers the slot 88 and abuts the temple side 90 of the hinge 38. The surface of the mouth is substantially co-planar with the surface of the temple side 90 of the hinge such that a substantially smooth surface is provided across the overlay 44 and the temple side 90 of the hinge 38.

The medial notch 80 and the lateral notch 82 form a living hinge on the temple member that provides additional flexibility for the temple member. In particular, as shown in FIG. 9, the column 46 on the spine 42 of the temple member is configured to pivot along an arc 98 defined by an axis S that extends through the slot 88 and is parallel to the axis H. While the hinge 38 provides for full pivoting of the temple member 40 (e.g., approximately 90°), the living hinge provided by the medial notch 80 and lateral notch 82 provide a more limited degree of pivoting of the temple member (e.g., between 1° and 20°). This additional degree of pivoting allotted by the living hinge provides additional comfort to the wearer when placing the frames on his or her head. Additionally, because the mouth 94 of the overlay 44 completely covers the medial notch 80 and the lateral notch 82, the living hinge is concealed to the eyes of the wearer.

The slot and living hinge arrangement of FIGS. 7-10 is particularly useful in combination with a shield lens. In particular, because the lens geometry defines the curvature of the eyeglasses with a shield lens, the curvature of the face member of the frames is defined by the generally circular shield shape. If a greater arc of the circular shape is used to form the frames, an unsightly "halo effect" may occur around the head of the wearer. On the other hand, if a smaller arc of the circular shape is used to form the frames, a narrower hinge-to-hinge measurement across the eyeglasses will occur, and this may cause the temple members to apply pressure on the head of the wearer. However, with the slot and living hinge arrangement of FIGS. 7-10, the a smaller arc may be used on eyeglasses with a shield lens, thus eliminating the "halo effect" and the living hinge arrangement providing pressure relief on the head of the wearer.

The foregoing detailed description of one or more exemplary embodiments of the eyeglass frames with flexible temples has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. Eyeglass frames comprising:
    a face member configured to retain at least one lens, and two temple members connected to the face member, each temple member including a spine and an overlay,
    the spine comprised of a first material and including a column and a plurality of transverse ribs, the column extending from a face-end to an ear-end of the temple member and the transverse ribs connected to the spine, each of the transverse ribs defining an angle relative to an axis defined by the column of the spine with slots formed between the ribs, the ribs successively narrower moving from the face-end to the ear-end, and
    the overlay comprised of a second material, the first material having a greater hardness than the second material, the overlay filling the slots formed between the ribs.

2. The eyeglass frames of claim 1 wherein the slots between the ribs are successively wider moving from the face-end to the ear-end.

3. The eyeglass frames of claim 1 wherein the overlay substantially covers the spine at the ear-end of the temple member but does not cover the plurality of transverse ribs.

4. The eyeglass frames of claim 1 wherein the overlay covers an upper side and a lower side of the spine along the ear-end of the temple member.

5. The eyeglass frames of claim 4 wherein the spine is exposed between the upper side and the lower side of the spine along a length that extends from the ear-end toward the face-end of the temple member.

6. The eyeglass frames of claim 5 wherein the spine includes an axial rib extending substantially parallel to the column, and the axial rib is exposed along the length that extends from the ear-end toward the face-end of the temple member.

7. The eyeglass frames of claim 4 wherein the overlay covers a tip of the ear-end of the temple member.

8. The eyeglass frames of claim 1 wherein the overlay extends along a lower side of the column from a tip of the ear-end to the face-end of the temple member.

9. The eyeglass frames of claim 1 wherein second material is more resilient than the first material.

10. The eyeglass frames of claim 1 wherein a thickness of the spine at the slots is between 1 mm and 3 mm and a thickness of the spine at the ribs is between 3 mm and 5 mm.

11. The eyeglass frames of claim 10 wherein the thickness of the spine at the slots is about 2 mm.

12. The eyeglass frames of claim 1 wherein the angle relative to the axis of the column of the spine is between is between forty and eighty degrees.

13. The eyeglass frames of claim 12 wherein the angle relative to the axis of the column of the spine is about sixty degrees.

14. The eyeglass frames of claim 12 wherein the angle relative to the axis of the column is defined by a ray directed away from the face of the eyeglass frames.

15. The eyeglass frames of claim 1 wherein the face member includes half-frame rims.

16. The eyeglass frames of claim 1 wherein the first material comprises a thermoplastic polyamide based on aliphatic and cycloaliphatic blocks and the second material comprises a thermoplastic polyurethane (TPU).

17. The eyeglass frames of claim 1 further comprising two hinges, each hinge connecting one of the two temple members to the face member and defining a pivot axis for the one of the temple members that is substantially perpendicular to the axis defined by the column of the spine, the spine further comprising an elongated notch extending substantially parallel to the pivot axis, the elongated notch positioned closer to the face-end than the ear-end of the one of the temple members.

18. Eyeglass frames comprising:
    a face member configured to retain at least one lens, and
    two temple members connected to the face member, each temple member including a spine and an overlay, the spine comprised of a first material and extending from a face-end to an ear-end of the temple member, and the overlay comprised of a second material, the first material having a greater hardness than the second material, the overlay only partially covering the spine such that a substantial portion of the spine is exposed on the temple member; and
    two hinges connecting the temple members to the face member, each hinge defining a pivot axis for the one of the two temple members that is substantially perpendicular to the axis defined by a column of the spine, the spine further comprising at last one elongated notch extending substantially parallel to the pivot axis on at least one of a medial or a lateral side of the spine, the notch covered by the overlay and positioned closer to the face-end than the ear-end of the one of the temple members, wherein a height of the spine in a direction defined by the pivot axis is equal at the notch and at positions immediately adjacent to the notch,
    wherein the at least one elongated notch on the spine includes a first elongated notch on the medial side of the spine and a second elongated notch directly opposed to the first elongated notch on the lateral side of the spine, wherein both of the first elongated notch and the second elongated notch cut into a central portion of the column of the spine but do not extend to upper and lower perimeters of the column of the spine,
    wherein the first elongated notch and the second elongated notch are positioned on the spine between 2 mm and 10 mm away from the pivot axis, a thickness of the spine between the first elongated notch and the second elongated notch is between 1.0 mm and 3.00 mm, and a thickness of the spine immediately adjacent to the first elongated notch and the second elongated notch is between 3.00 mm and 6.00 mm.

* * * * *